UNITED STATES PATENT OFFICE.

WILLARD E. CASE, OF AUBURN, NEW YORK.

PROCESS OF MAKING ALUMINUM FLUOSULPHATE.

SPECIFICATION forming part of Letters Patent No. 504,325, dated September 5, 1893.

Application filed April 29, 1891. Renewed February 6, 1893. Serial No. 459,497. (No specimens.)

*To all whom it may concern:*

Be it known that I, WILLARD E. CASE, of Auburn, Cayuga county, New York, have invented a new and useful Improvement in the Manufacture of Aluminum Fluosulphate or Aluminum-Sodium Fluosulphate, of which the following is a specification.

The object of my invention is to produce an aluminum-fluo-sulphate compound which shall be free from iron, and which may be utilized in place of pure sulphate of alumina or alum in paper making. I find that this aluminum fluo-sulphate may be produced more cheaply than the pure sulphate, and that in the paper-making industry it serves the same purpose. It also may be used as a source of metallic aluminum, and in certain other applications for Letters Patent, serially numbered 388,307, 388,308, 388,309 and 388,310, filed by me on the 9th day of April, 1891, and now pending, I have described various modes of treating it for aluminum extraction.

I produce my aluminum fluo-sulphate compound by the following process: I dissolve crude aluminum sulphate in water and add thereto calcium fluoride, preferably heating the solution to a temperature of 180° Fahrenheit in order to expedite the reaction. The result is an aluminum fluo-sulphate solution, and the aforesaid reaction may probably be represented by the following formula:

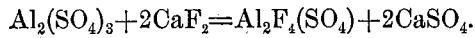
$$Al_2(SO_4)_3 + 2CaF_2 = Al_2F_4(SO_4) + 2CaSO_4.$$

As is well known, crude (or commercial) aluminum sulphate is more or less charged with iron which must be wholly extracted therefrom in order to adapt the material for the uses of the paper-maker. It is also well known that impure aluminum sulphate heavily charged with iron is considerably cheaper than pure aluminum sulphate, and that if the iron can be cheaply extracted from the crude material, the cost of the resulting product may be greatly reduced. In order to remove the iron thus cheaply and also thoroughly from the fluo-sulphate solution produced as above described, I add to it a solution of an alkali carbonate, such as sodium carbonate or soda ash, until upon removing and filtering a small sample of the solution it shows a very slight, if any, reaction for iron with potassium ferrocyanide. I prefer to bring the fluo-sulphate solution to a specific gravity of about 1.040 for this step, to use a saturated solution of the alkali-carbonate, and to allow it to stand several hours after adding the carbonate. I prefer, next, to filter the solution, by means of which the ferruginous precipitate is removed and a clear resulting solution of probably aluminum-alkali, or aluminum-sodium fluo-sulphate is produced. This substance I supply to the market as an article of manufacture either in the form of a solution, or in solid condition.

I claim—

1. The process of producing aluminum alkali fluo-sulphate free, or substantially free, from iron, which consists in adding calcium fluoride to an aqueous solution of crude aluminum sulphate, then adding a solution of an alkali carbonate, to precipitate iron and then mechanically separating the liquid from the solid products of the reaction.

2. The process of producing aluminum sodium fluo-sulphate free, or substantially free, from iron, which consists in adding calcium fluoride to an aqueous solution of crude aluminum sulphate, then adding a solution of sodium carbonate, to precipitate iron and then separating the aluminum sodium fluo-sulphate solution from the solid products of the reaction by filtration.

WILLARD E. CASE.

Witnesses:
F. S. DRISCOLL,
P. J. MCINTYRE.